US006357575B1

(12) United States Patent
Conte

(10) Patent No.: US 6,357,575 B1
(45) Date of Patent: Mar. 19, 2002

(54) EQUIPMENT FOR THE FEEDING OF CABLE ENDS TO FINISHING TREATMENT UNITS

(75) Inventor: Alois Conte, Ebikon (CH)

(73) Assignee: Komax Holding AG, Dierikon (CH)

( * ) Notice: Subject to any disclaimer, the term of this patent is extended or adjusted under 35 U.S.C. 154(b) by 0 days.

(21) Appl. No.: 09/503,456

(22) Filed: Feb. 14, 2000

(30) Foreign Application Priority Data

Feb. 12, 1999 (EP) .......................................... 99 810132

(51) Int. Cl.[7] ............................................... B65G 47/86
(52) U.S. Cl. .................................................... 198/468.2
(58) Field of Search ........................... 198/468.2, 468.4, 198/470.1; 83/277; 226/162

(56) References Cited

U.S. PATENT DOCUMENTS

| | | | | |
|---|---|---|---|---|
| 4,638,904 A | * | 1/1987 | Randar et al. | 198/468.2 |
| 4,678,393 A | * | 7/1987 | Mink | 198/468.2 |
| 6,003,655 A | * | 12/1999 | Tanaka et al. | 198/468.2 X |

FOREIGN PATENT DOCUMENTS

| | | |
|---|---|---|
| CH | 673 858 A5 | 4/1990 |
| EP | 303 724 A1 | 2/1989 |
| EP | 876 885 A1 | 11/1998 |

* cited by examiner

*Primary Examiner*—James R. Bidwell
(74) *Attorney, Agent, or Firm*—Cohen, Pontani, Lieberman & Pavane

(57) ABSTRACT

A cable feeder having a first drive unit, a second drive unit, a third drive unit and grippers. The first drive unit has a platform, which is rotatable about a third point of rotational and driven by a motor via a belt. The second drive unit is carried by the platform and arranged to be displaceable on the platform in the direction of an axis by the third drive unit. The grippers with the cable ends when in the operating region of an automatic insulation-stripping device are controlled by the second drive unit so that both cable axes extend parallelly and the cable ends are stripped of insulation at the same time. Thereafter, the second drive unit with the grippers is displaced rearwardly in the direction of the axis by the third drive unit and pivoted into the operating range of the following automatic device for the equipping of sealing sleeves. After this operation, the cable ends are brought into the operating region of an automatic crimping device.

3 Claims, 8 Drawing Sheets

EQUIPMENT FOR THE FEEDING OF CABLE ENDS TO FINISHING TREATMENT UNITS

BACKGROUND OF THE INVENTION

1. Field of the Invention

The invention relates to equipment for the feeding of cable ends to finishing treatment units which treat the cable ends.

2. Discussion of the Prior Art

Several treatment steps are necessary for the manufacture, ready for use, of a cable end. After cutting the cable to length, the cable end is, for example, stripped of insulation, if necessary provided with a sealing sleeve and subsequently connected with a contact by crimping technique. The individual steps are executed by automatic devices which are arranged, for example, rectilinearly or, for example, circularly, wherein one treatment step after the other is carried out. A first automatic device strips the cable end of insulation, a second automatic device places the sleeve onto the insulation and a third automatic device produces the crimped connection. A unit operating as feeder firmly retains the cable end during the finishing treatment and brings it, by, for example, a horizontal linear movement, and/or a rotational movement in the correct treatment sequence from one automatic device to other automatic devices. The feeder unit usually consists of grippers for the retention of the cable ends and of drives for the linear and/or rotational movement of the grippers.

A disadvantage of the known feeder units is the plurality of drives and linear guides, for which relatively large masses must be moved and correspondingly only slow movements are possible. The working performance of the entire finishing treatment plant is too dependent on the performance capability of the feeder unit.

SUMMARY OF THE INVENTION

Accordingly, it is an object of the present invention to provide equipment that avoids the disadvantages of the known equipment and by means of which the performance capability of the feeder unit and thus of the finishing treatment plant can be improved.

Pursuant to this object, and others which will become apparent hereafter, one aspect of the present invention resides in equipment for feeding cable ends to finishing treatment units which treat the cable ends, which equipment comprises feeder means for feeding at least two cable ends at the same time for the treatment. In one embodiment the feeder means includes drive units for feeding the cable ends, and grippers for retaining the cable ends. In another embodiment the drive units are common to the grippers and drive the grippers linearly and/or rotationally. In still another embodiment the grippers are movable into either positions for feeding the cable ends or into settings for treatment of the cable ends. In still a further embodiment a bracket having arms is provided and the grippers are mounted on the bracket. Means for driving the grippers are also mounted on the bracket.

The advantages achieved by the invention are to be seen substantially in that no mechanical adaptation of the automatic treatment devices is necessary. The equipment according to the invention takes the mechanical conditions of the individual automatic devices into consideration for feeding the cable, such as, for example, the horizontal introduction of the conductor into the tool of an automatic crimping device. It is furthermore advantageous that the ends of a cable can be simultaneously finished ready for use. The mechanically simple build-up of the feeder unit according to the invention, wherein merely one motor and one linear guide are necessary for two grippers, is furthermore advantageous.

The invention is explained more closely in the following by reference to drawings illustrating an embodiment.

DETAILED DESCRIPTION OF THE PREFERRED EMBODIMENTS

Figure 1:
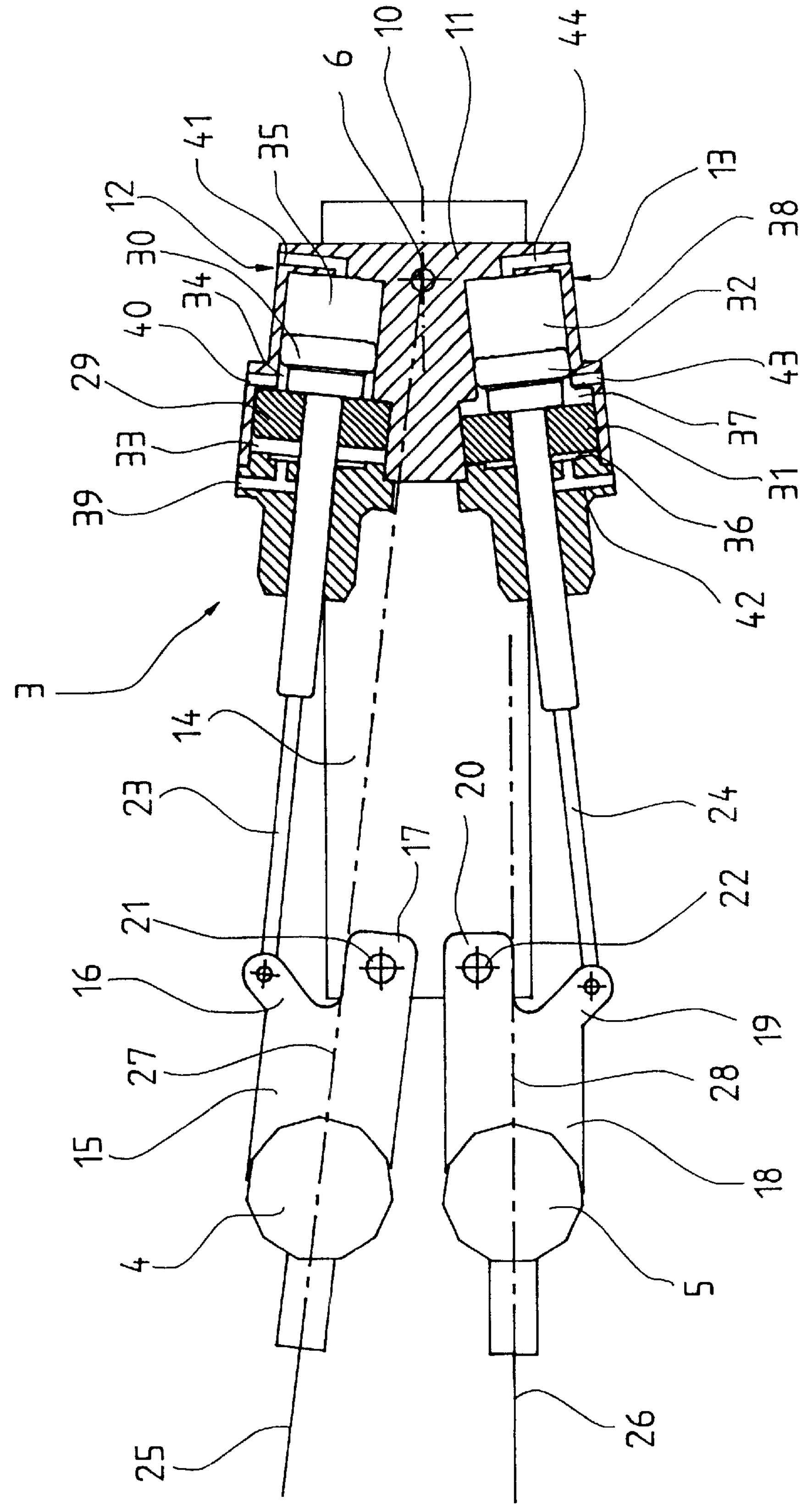
FIG. 1 shows a schematic illustration of a cable feeder with two pivotable grippers.

A cable feeder, which essentially consists of a first drive unit 2, and of a second drive unit 3 with grippers 4 and 5, is denoted by 1. The first drive unit 2, for example, comprises a platform 7, which is rotatable about a third point of rotation 6 and driven, for example, by means of a motor 9 by way of a belt 8. The second drive unit 3 is carried by the platform 7 and is arranged to be displaceable thereat in the direction of an axis 10 by means of a third drive unit 2.1.

The second drive unit 3 consists of a bracket 11, which is carried by the platform 7, with cylinders 12, 13 and a third arm 14 of the bracket 11. The grippers 4, 5 are rotatably mounted at the third arm 14. In the case of the linear movement shown in FIG. 4, the entire second drive unit 3 inclusive of the grippers 4, 5 is moved by means of the third drive unit 2.1. The first gripper 4 is arranged at a first arm 15 with two limbs 16, 17 and the second gripper 5 is arranged at a second arm 18 with two limbs 19, 20. The second limb 17 of the first arm 15 is mounted at a first point of rotation 21 of the third arm 14 and the fourth limb 20 of the second arm 18 is mounted at a second point of rotation 22 of the third arm 14. A first piston rod 23 of the second drive unit 3 engages at the first limb 16 of the first arm 15 and a second piston rod 24 of the second drive unit 3 engages at the third limb 19 at the second arm 18. The first gripper 4 is constructed as, for example, a centring clamping gripper and retains a first cable end 25 and the second gripper 5 is constructed as, for example, a centring clamping gripper and retains a second cable end 26. The cable ends 25, 26 can be the ends of a single cable or a respective end of separate cables. A first cable axis is denoted by 27 and a second cable axis is denoted by 28, wherein the cable axes 27, 28 can, according to the setting of the piston rods 23, 24, extend parallelly through the third point of rotation 6 or extend so as to depart far from the parallel position.

A first piston 29 and a second piston 30 are arranged in the first cylinder 12 and a third piston 31 and a fourth piston 32 are arranged in the second cylinder 13, by means of which the aforementioned different settings of the first piston rod 23 or the second piston rod 24 are producible. The first cylinder 12 together with the pistons 29, 30 forms a first chamber 33, a second chamber 34 and a third chamber 35, and the second cylinder 13 together with the pistons 31, 32 forms a fourth chamber 36, a fifth chamber 37 and a sixth chamber 38. The first chamber 33 has a first pressure medium entry 39, the second chamber 34 has a second pressure medium entry 40, the third chamber 35 has a third pressure medium entry 41, the fourth chamber 36 has a fourth pressure medium entry 42, the fifth chamber 37 has a fifth pressure medium entry 43 and the sixth chamber 38 has a sixth pressure medium entry 44.

In the setting of the first gripper 4 shown in FIG. 1, the first pressure medium entry 39 and the third pressure medium entry 41 are acted on, in which case the pistons 29, 30 are urged against each other and the first piston rod 23 connected with the second piston 30 so sets the first gripper 4 that the first cable axis 27 extends through the third point of rotation 6. In this cable position, the sealing sleeve is mounted or a contact is connected with the cable end 25, 26 by crimping.

In the setting of the second gripper 5 shown in FIG. 1, the sixth pressure medium entry 44 is acted on, in which case the pistons 31, 32 are urged in the direction of second grippers 5 and the second piston rod 24 connected with the fourth piston 32 so sets the second gripper 5 that the second cable axis 28 assumes the parallel position. In this cable position, the cable ends 25, 26 are stripped of insulation at the same time, in which case the first cable axis 27 is also in the parallel position, as shown in FIGS. 3 and 6.

Figure 2:
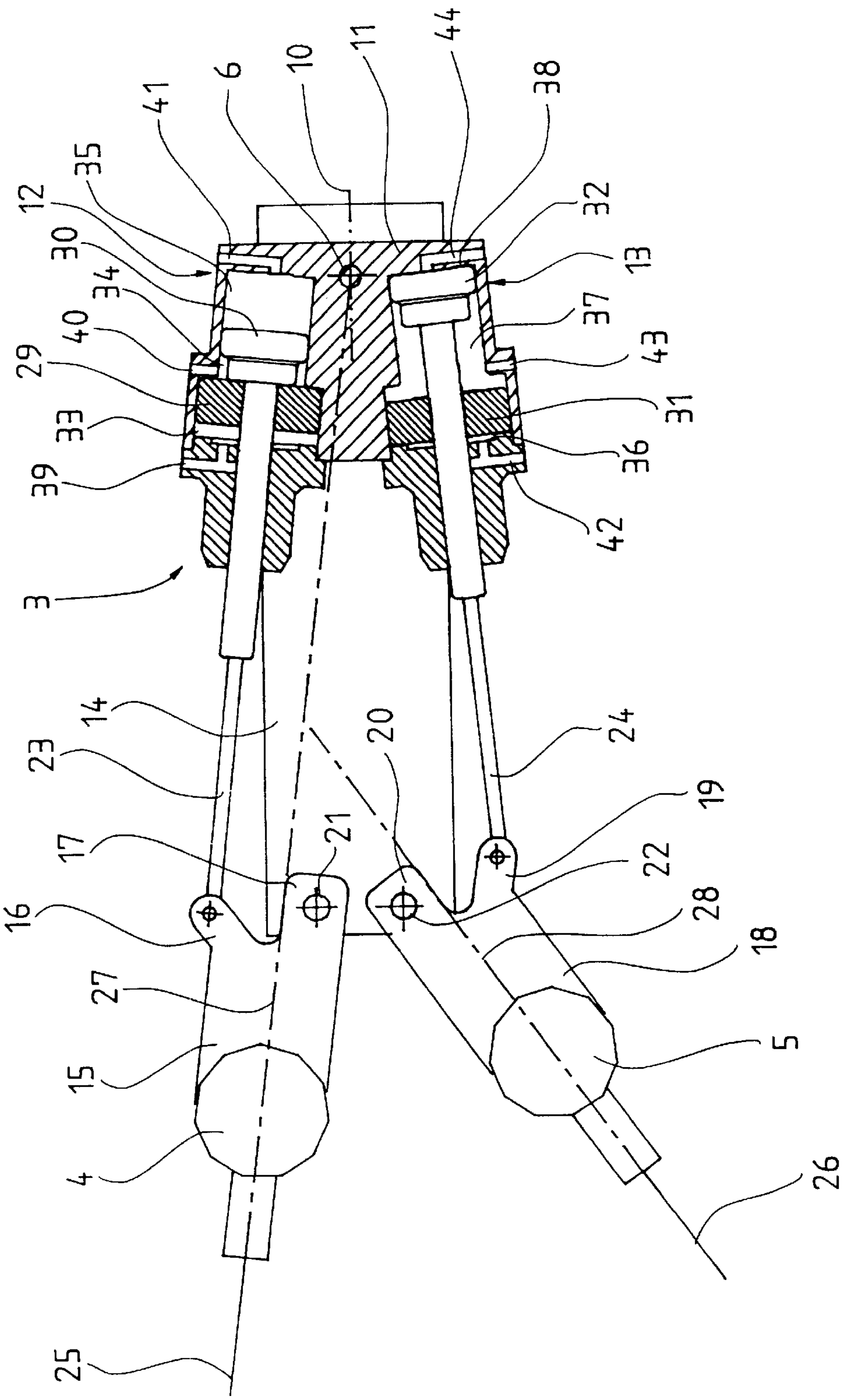
FIG. 2 shows the cable feeder with grippers pivoted out.
Figure 5:
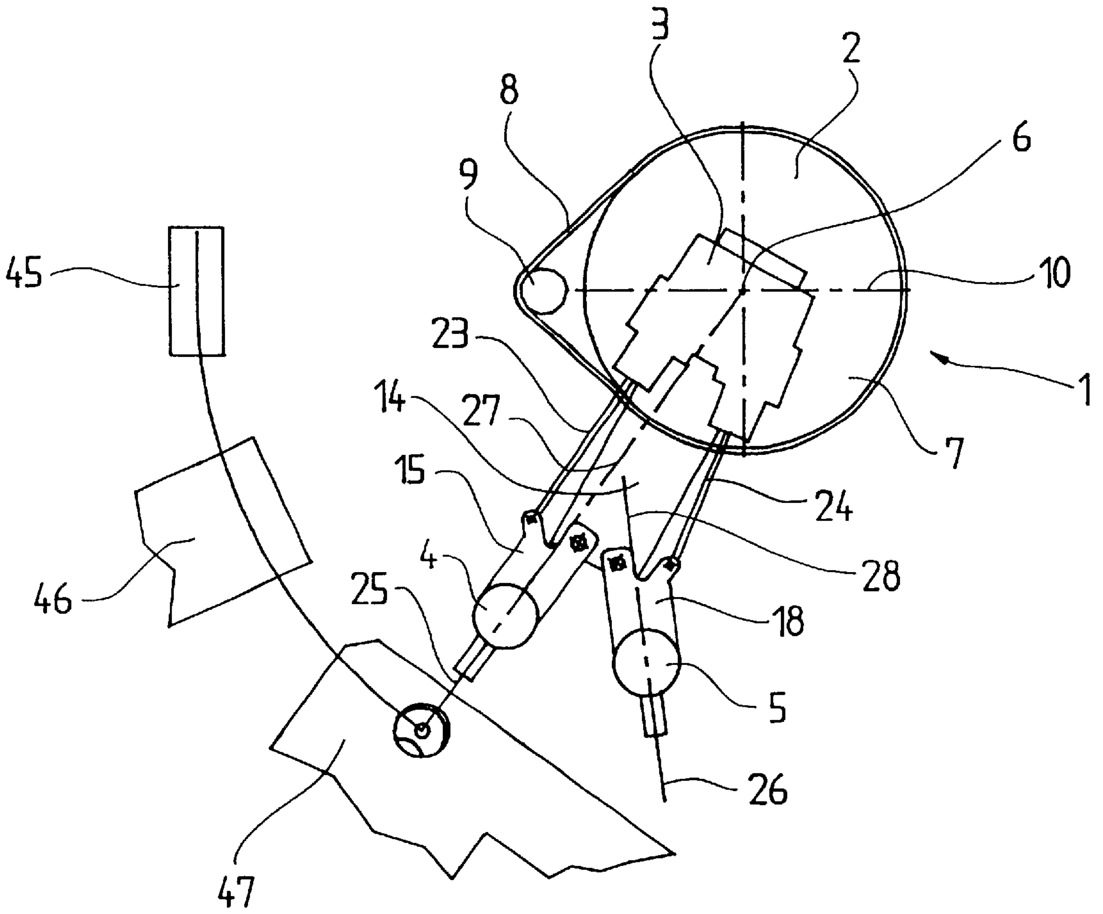
FIG. 5 shows the cable feeder with a gripper in the operating region of an automatic crimping device and a gripper pivoted out of the operating region of the automatic crimping device.
Figure 8:
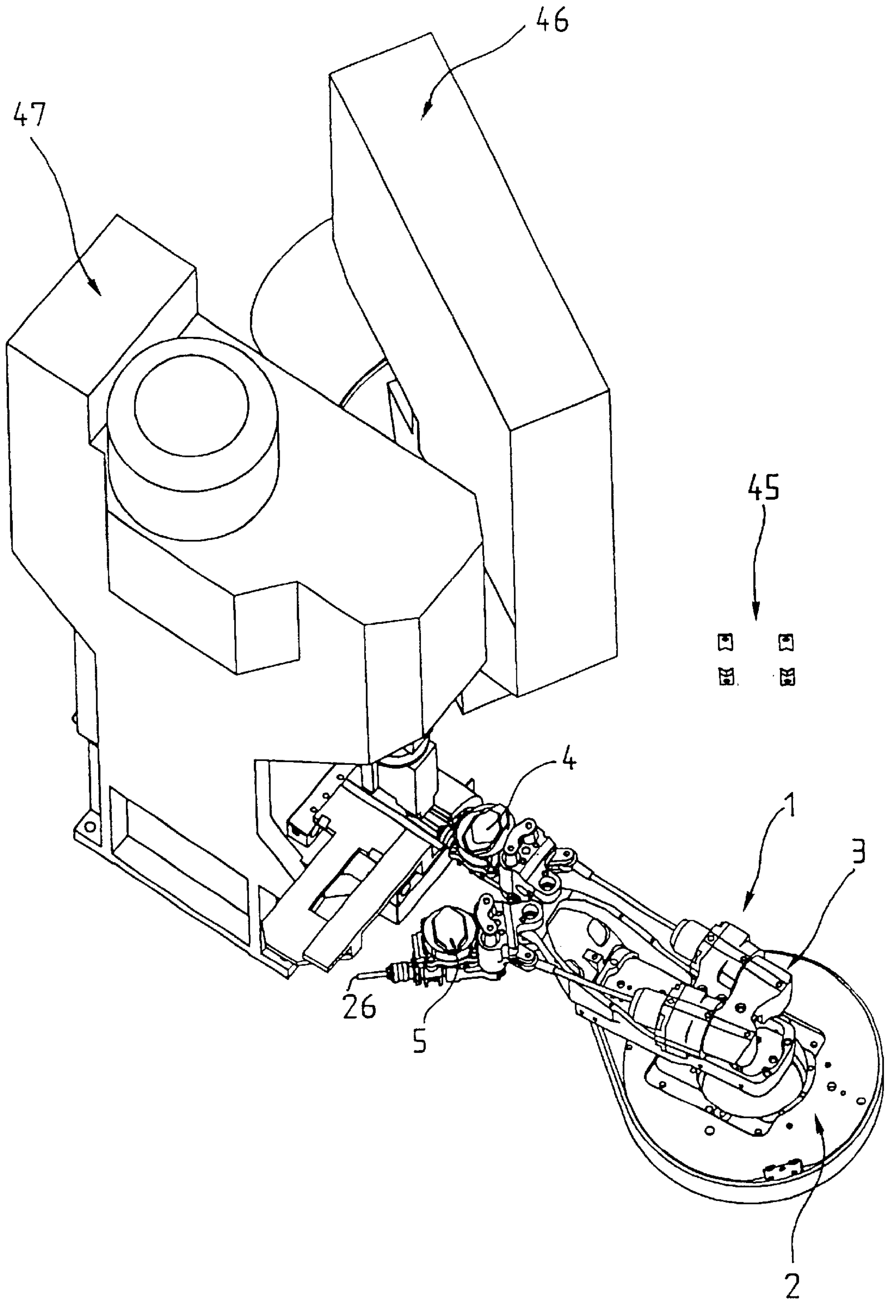
FIG. 8 shows a three-dimensional illustration of the cable feeder with a gripper in the operating region of the automatic crimping device and a gripper pivoted out of the operating region of the automatic crimping device.

In the setting of the second gripper 5 shown in FIG. 2, the fifth pressure medium entry 43 is acted on, in which case the pistons 31, 32 are urged apart and the second piston rod 24 connected with the fourth piston 32 so sets the second gripper 5 that the second cable axis 28 departs far from the parallel position. In this setting, the second gripper 5 is pivoted out of the operating range, for example of the automatic crimping device, as shown in FIGS. 5 and 8. Thereby, the cable end 26 is prevented from being damaged by the automatic device.

Figure 3:
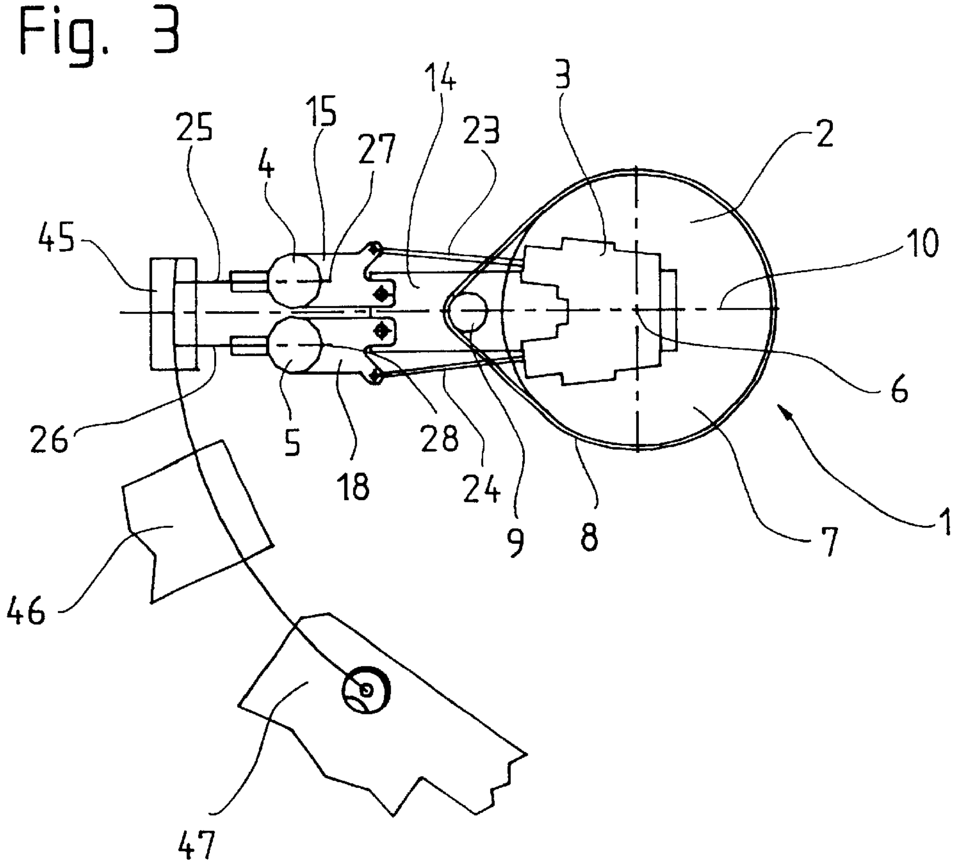
FIG. 3 shows the cable feeder with parallel grippers for the simultaneous feeding of two cables to an operating region of an automatic insulation-stripping device.
Figure 6:
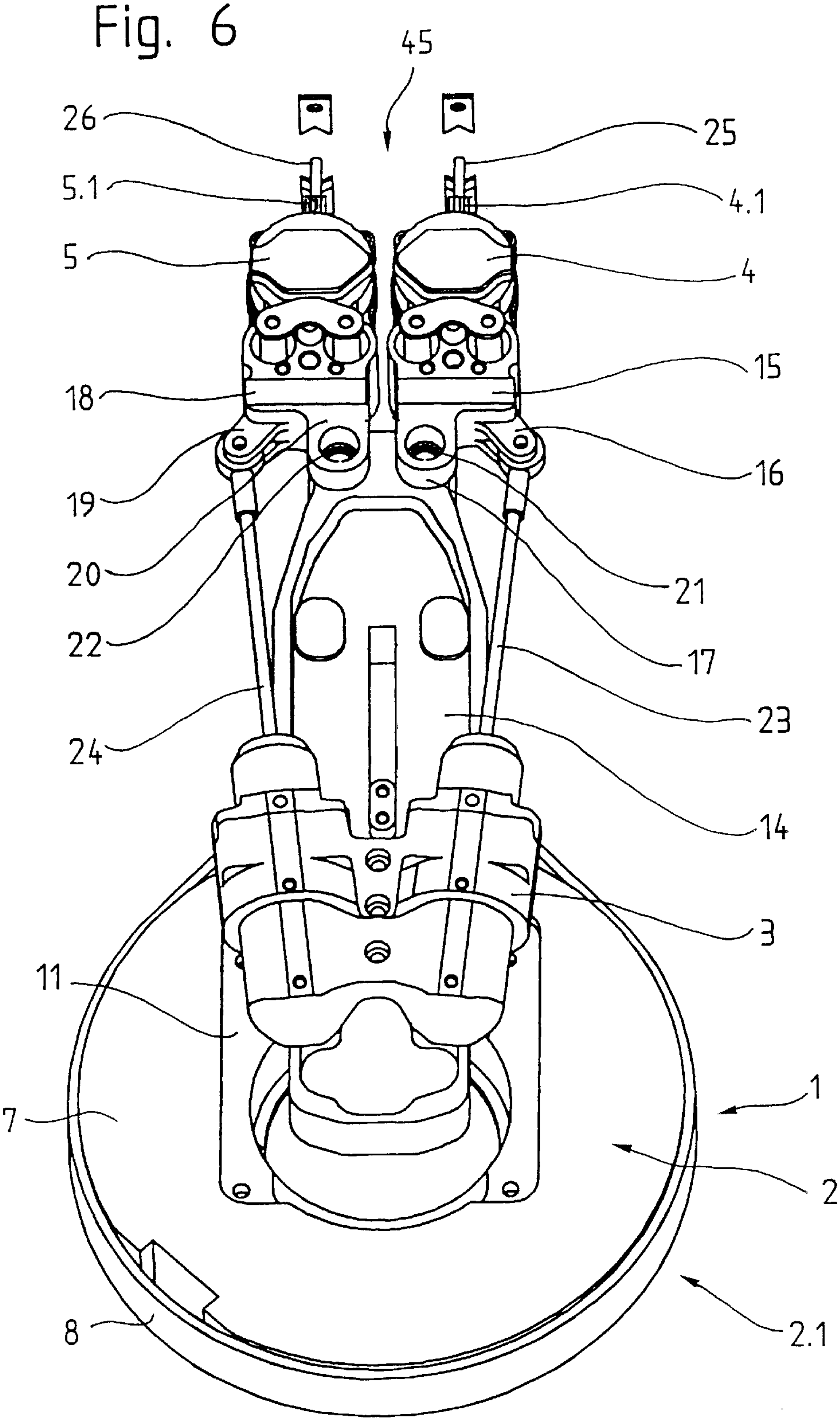
FIG. 6 shows a three-dimensional illustration of the cable feeder with grippers, which are provided for the feeding of leading cable ends, in parallel position in the operating region of the automatic insulation-stripping device.

FIGS. 3 and 6 show the cable feeder 1 with the cable ends 25, 26 in the operating range of an automatic insulation-stripping device 45, wherein the cylinders 12, 13 are so controlled in drive that the two cable axes 27, 28 extend parallelly and the cable ends 25, 26 are stripped of insulation individually or simultaneously.

Figure 4:
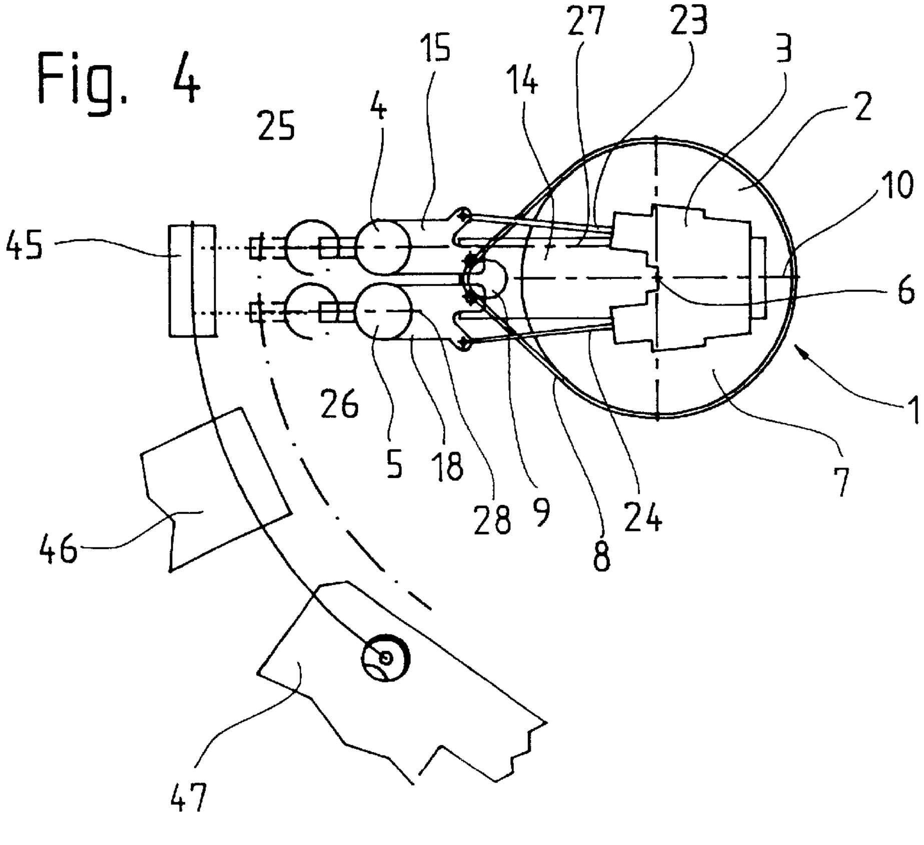
FIG. 4 shows the cable feeder with the grippers outside the operating region.

FIG. 4 shows the cable feeder 1 in a pivoted position, wherein the second drive unit 3 on the platform 7 has been moved away from the automatic insulation-stripping device 45 in the direction of the axis 10 by means of the third drive unit 2.1. The setting of the grippers in the operating region of the finishing treatment units is illustrated by a broken line.

Figure 7:
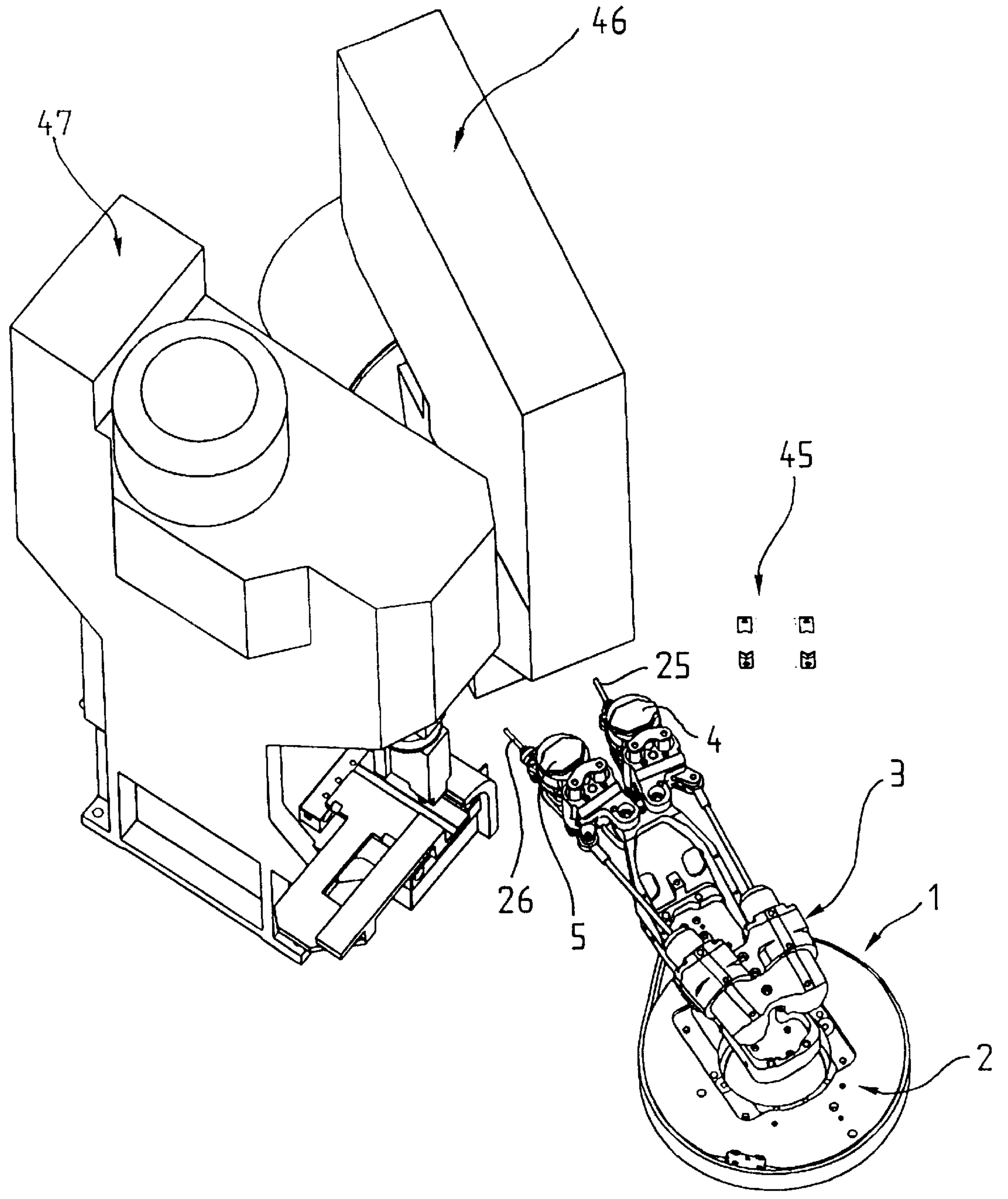
FIG. 7 shows a three-dimensional illustration of the cable feeder in the operating region of an automatic device for the assembly of sealing sleeves.

FIG. 7 shows the cable feeder 1 with the first cable end 25 in the operating range of an automatic device 46 for the equipping with sealing sleeves, wherein the two cable axes 27, 28 extend through the third point of rotational 6.

FIGS. 2, 5 and 8 show the cable feeder 1 with the first cable end 25 in the operating region of an automatic crimping device 47 and the second cable end 26 pivoted out of the operating region.

Figure 9:
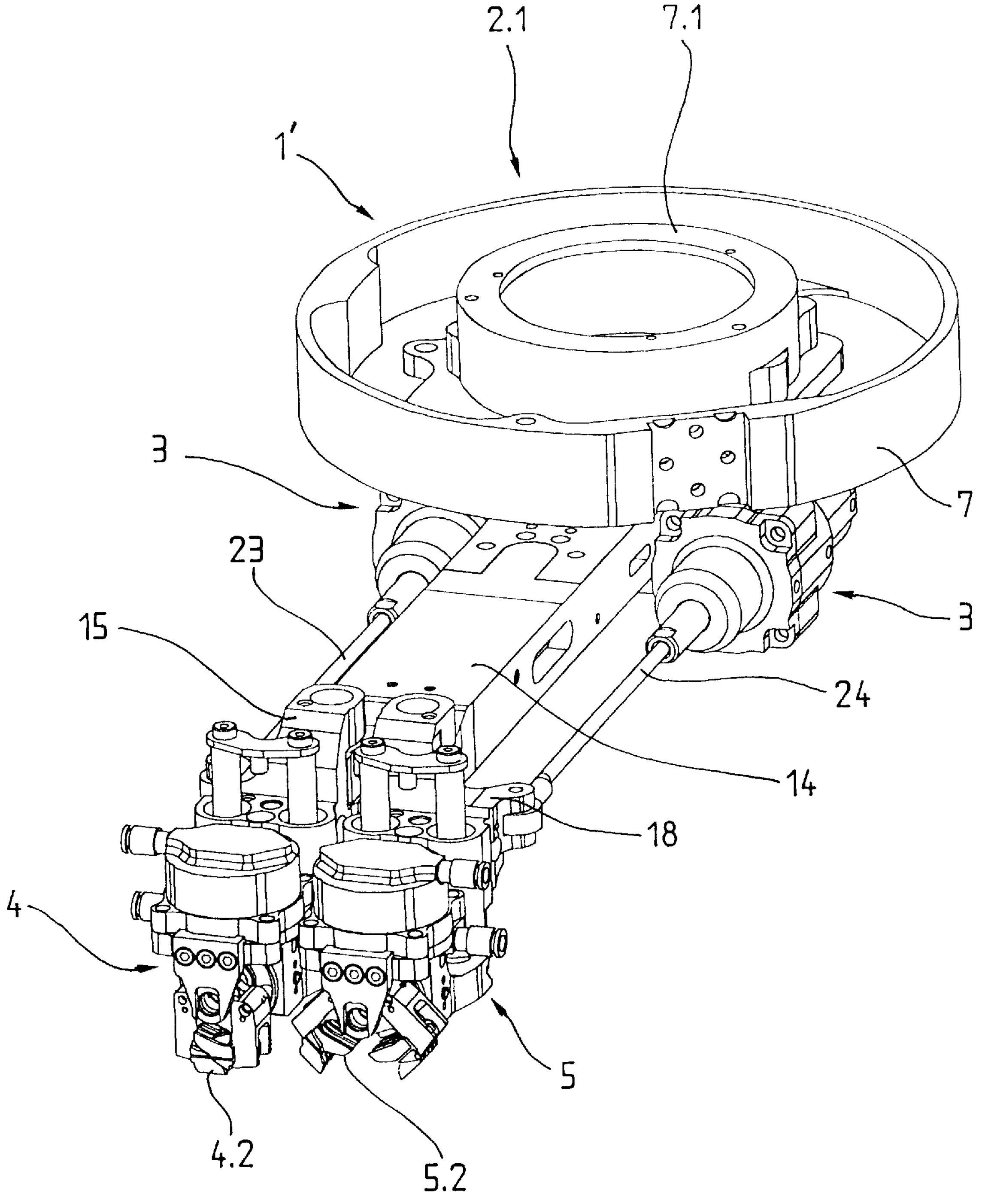
FIG. 9 shows a three-dimensional illustration of a cable feeder with grippers for the feeding of trailing cable ends.

The grippers 4 and 5 shown in FIGS. 6, 7 and 8 serve for the feeding of the leading cable ends 25, 26, which are called side "1" in the jargon of the art, to the finishing treatment units 45, 46, 47. The cable ends 25, 26 are advanced from the rear side through the grippers 4, 5 by means of an advancing unit, which is not shown. The grippers 4, 5 comprise guide tubes 4.1, 5.1 at the treatment side, as shown in FIG. 6, through which the cable ends 25, 26 are pushed and which serve for the guidance of the cable ends 25, 26. The build-up of the grippers 4, 5 of the side 1 is such that they can merely retain the cable ends 25, 26. After the finishing treatment of the side 1, the grippers 4, 5 return to the automatic insulation-stripping device 45. Then, the cables are advanced and the trailing cable ends, which are called side "2" in the jargon of the art, are taken over by the feeder 1', as shown in FIG. 9. The feeder according to FIG. 9 is equipped with grippers 4, 5, which can seize, retain or release the cable ends. For the execution of these functions, gripper jaws 4.2, 5.2 are necessary, which can open and close. FIG. 9 shows the one gripper 4 with closed, interengaging gripper jaws 4.2 and the other gripper 5 with opened gripper jaws 5.2. Furthermore, in the case of the feeder 1' according to FIG. 9 by contrast to the feeder 1 according to FIG. 6, the second drive unit 3 is arranged underneath and the third drive unit 2.1 is arranged above the platform 7. 7.1 denotes a flange at which the third drive unit 2.1 for the linear displacement, which is shown in FIG. 4, of the second drive unit 3 is arranged. For example, a pinion, which is not illustrated, engages into a toothed rack, also not illustrated, and produces the linear displacement of the second drive unit 3.

The settings of the grippers 4, 5 are not restricted to the settings shown in the figures. Each gripper 4, 5 can assume the parallel position, the position of the cable axis 27, 28 through the third point of rotation 6, or the position outside an operating region.

In a further embodiment, the grippers 4, 5 can also be moved non-horizontally, for example downwardly, out of the respective operating region.

In a further embodiment, the automatic treatment devices 45, 46, 47 can be arranged, instead of on the above-shown circular arrangement, on a straight line, wherein the second drive unit 3 executes a linear movement in place of the rotational movement. The first drive unit 2 with, for example, a linear drive moves on a linear axis in this case. The setting of the grippers 4, 5, for which the cable axis 27, 28 runs through the third point of rotation 6, can be dispensed with in the case of the linear feeding.

In a further embodiment, the cable end 25, 26 can be brought to the finishing treatment units by a movement consisting of horizontal, vertical, linear and/or rotational components.

The invention is not limited by the embodiments described above which are presented as examples only but can be modified in various ways within the scope of protection defined by the appended patent claims.

I claim:

1. Equipment for feeding cable ends to finishing treatment units which treat the cable ends, comprising feeder means for feeding at least two cable ends at the same time for treatment, the feeder means including drive units for feeding the cable ends and grippers for retention of the cable ends, the drive units being common to the grippers and operative to drive the grippers at least one of linearly and rotationally.

2. Equipment according to claim 1, wherein the grippers are movable into one of positions for feeding and settings for treatment of the cable ends.

3. Equipment according to claim 1, and further comprising a bracket, arms at which the grippers are arranged, and means for driving the grippers, the arms and the drive means being mounted to the bracket, which has arms and is movable by the drive units.

* * * * *